United States Patent [19]

Moscicki

[11] Patent Number: 5,139,104
[45] Date of Patent: Aug. 18, 1992

[54] DEVICE FOR SUSPENSION OF DRIVER'S CAB IN RELATION TO CHASSIS

[75] Inventor: Christian Moscicki, Charantonnay, France

[73] Assignee: Renault Vehicules Industriels, Lyons, France

[21] Appl. No.: 690,262

[22] Filed: Apr. 24, 1991

[30] Foreign Application Priority Data

Apr. 27, 1990 [FR] France .................. 90 05375

[51] Int. Cl.$^5$ .......................................... B62D 33/063
[52] U.S. Cl. ................... 180/89.13; 180/89.14; 180/89.15; 180/41; 180/328; 280/840
[58] Field of Search ............... 180/89.13, 89.14, 89.15, 180/41, 328; 280/840

[56] References Cited

U.S. PATENT DOCUMENTS

| 4,801,155 | 1/1989 | Fukushima et al. | ............ 280/840 X |
| 4,830,397 | 5/1989 | Watanabe et al. | ............ 280/840 X |

FOREIGN PATENT DOCUMENTS

| 2576555 | 8/1986 | France . | |
| 2583012 | 12/1986 | France . | |
| 2589107 | 4/1987 | France . | |
| 2617921 | 1/1989 | France . | |
| 2641591 | 7/1990 | France . | |
| 1205148 | 9/1970 | United Kingdom | .................. 180/41 |
| 2014522 | 8/1979 | United Kingdom . | |
| 2107656 | 5/1983 | United Kingdom . | |

Primary Examiner—H. Grant Skaggs
Assistant Examiner—Carol Lynn Druzbick
Attorney, Agent, or Firm—Oblon, Spivak, McClelland, Maier & Neustadt

[57] ABSTRACT

A device for suspension of a driver's cab (2) in relation to chassis (1) of a motor vehicle includes four hydraulic cylinders (5a-5d), each consisting of a hollow body connected to the chassis. A piston (9) slides axially in each body and delimits an upper chamber (10) and a lower chamber (11) therein. Each piston is integral with a first rod (12) connected to the cab and with a second rod (13) connected to the chassis. Ducts (17a-17d) are filled with virtually incompressible fluid and connect the upper chamber of a given cylinder to the lower chamber of the cylinder which is diagonally opposite thereto.

4 Claims, 1 Drawing Sheet

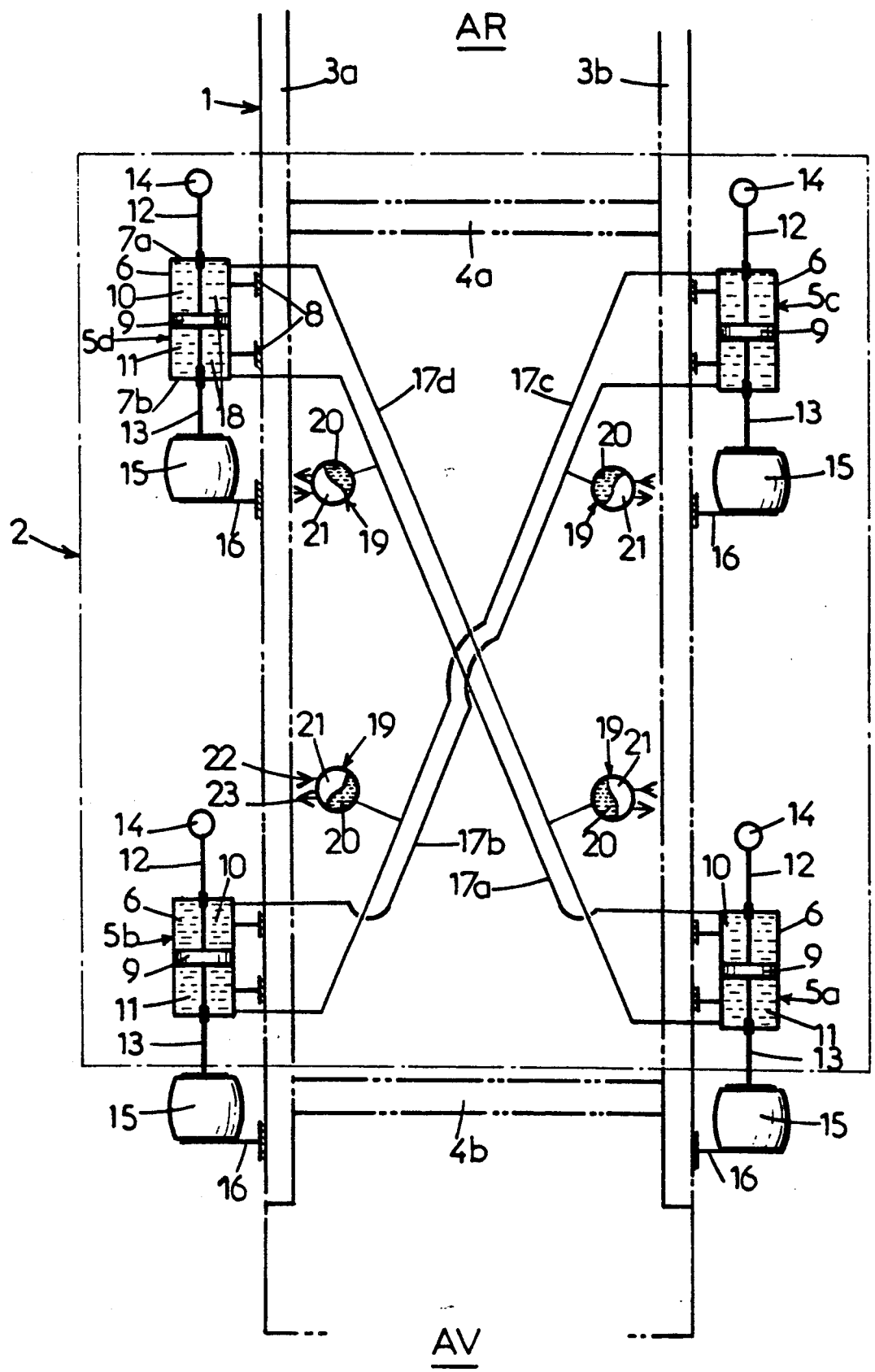

DEVICE FOR SUSPENSION OF DRIVER'S CAB IN RELATION TO CHASSIS

BACKGROUND OF THE INVENTION

1. Field of the Invention

This invention relates to a device for suspension of a driver's cab in relation to a chassis of a motor vehicle.

2. Description of the Related Art

Known devices for suspending the cab in relation to the chassis, generally consisting of two side rails, are in the form of a mechanical device such as a torsion bar or the like placed between the cab and the side rails.

These devices, although being partially satisfactory, nevertheless exhibit some drawbacks. In the first place, these devices are heavy and bulky. In the second place, during a sudden deceleration of the moving vehicle, such as a braking for example, the driver's cab, due to its stored kinetic energy, has a tendency to undergo a movement in which the front of the cab is inclined in the direction of the ground while the rear of this cab is raised.

In this movement, the occupant of the vehicle has a sensation of "dipping" forward which is detrimental to the comfort of the occupant, and after this "dipping" movement the driver's cab, before returning to a static state, undergoes an oscillatory motion from front to back that can last a certain time, which also detracts from the driving comfort of the occupant.

SUMMARY OF THE INVENTION

This invention has as an object to eliminate the above drawbacks by providing a suspension device of very simple design and operation while obtaining a great comfort for the occupant of the cab.

The above and other objects are achieved by a device for suspension of a driver's cab in relation to the chassis of a motor vehicle, including four hydraulic cylinders each consisting of a hollow body connected to the chassis and a piston that can slide axially in said body and that delimits therein an upper chamber and a lower chamber. The chambers are filled with a virtually incompressible fluid and the piston is integral with a first rod directed upward and connected to the cab and with a second rod directed downward and connected to the chassis, said cylinders being placed under the right front part, the left front part, the right rear part and the left rear part of the cab, respectively. Ducts filled with the virtually incompressible fluid connect the upper chamber of a given cylinder to the lower chamber of the cylinder which is diagonally opposite thereto.

According to a preferred embodiment, the rods directed downward are connected to the chassis by an elastically deformable element.

According to the preferred embodiment, each duct is provided with a device for regulating the pressure of the fluid.

According to a particular embodiment, the device for regulating the pressure consists of a gas cushion.

BRIEF DESCRIPTION OF THE DRAWINGS

The invention will be better understood on reading the following description, made by way of example, and with reference to the single figure which schematically shows in plan view the suspension device according to this invention.

DETAILED DESCRIPTION OF THE PREFERRED EMBODIMENT

In the figure, a motor vehicle chassis 1 supports a driver's cab 2. Chassis 1 generally consists of two parallel, spaced lateral side rails 3a and 3b, connected to one another by cross beams 4a and 4b.

In the following description, the front part AV of the cab corresponds to the bottom of the figure, while rear part AR corresponds to the top of this figure.

According to this invention, driver's cab 2 is suspended in relation to chassis 1 via first through fourth hydraulic cylinders 5a, 5b, 5c and 5d extending vertically between chassis 1 and driver's cab 2 (the cylinders are shown extending horizontally in the figure for clarity of illustration only).

As the figure shows, two cylinders 5a and 5b are placed on the right and left, respectively, of the front of the cab while two cylinders 5c and 5d are placed on the right and left, respectively, of the rear of this cab, i.e., the first and fourth cylinders are mutually diagonal, and the second and third cylinders are mutually diagonal.

Each hydraulic cylinder is made of a hollow body 6, of generally cylindrical shape, closed by end walls 7a, 7b and fastened at 8 to the chassis, and of a solid piston 9, of a shape matching that of the inner wall of hollow body 6, placed inside hollow body 6 in a fluidtight manner while being free to be displaced axially inside this hollow body.

Piston 9 delimits, inside the hollow body, an upper chamber 10 located above the piston and a lower chamber 11 located below said piston.

From the face of piston 9 that faces upper chamber 10 a first rod 12, or upper rod, extends upward which passes through the upper chamber and extends beyond end wall 7a. Furthermore, from the face of this piston that is directed toward lower chamber 11, a second rod 13, or lower rod, extends downward which passes through this chamber and extends beyond end wall 7b of hollow body 6, rod 12 and rod 13 passing through these end walls in a fluidtight manner.

Because of this, a displacement of piston 9, for example upward, causes one rod 12 to come out and the other rod 13 to go in.

As shown in the single figure, the free end of each upper rod 12 of hydraulic cylinders 5a-5d is connected at 14 to the driver's cab while the free end of each lower rod 13 is connected to the chassis by elastically deformable elements 15, such as rubber elements, these rubber elements being carried by supports 16 that are fastened to the chassis.

Furthermore, upper chamber 10 of a given hydraulic cylinder is connected by a duct such as 17a, 17b, 17c or 17d, to lower chamber 11 of the diagonally opposite hydraulic cylinder. Upper chambers 10 and lower chambers 11 and ducts 17 are filled with a virtually incompressible fluid 18.

In practice, each duct 17, with an upper chamber 10 and lower chamber 11 to which it is connected, form a closed hydraulic circuit independent of the others.

Thus, for each hydraulic circuit, any variation in volume of a chamber of a cylinder produces the same variation in volume in the corresponding diagonal chamber to which it is connected by one of the ducts.

Advantageously, it is possible to place on each duct 17 a pressure regulating device 19 whose purpose is to regulate the pressure of the fluid circulating between the upper chamber of a cylinder and the lower chamber of the cylinder to which it is connected.

This regulating device comprises a fluidtight chamber 20 in which a gas cushion 21 is provided and in which the pressure of the gas can be made to vary so as to produce a variation in the pressure of the fluid in the duct to which chamber 20 is connected, and therefore in the chambers to which said duct connected. This makes it possible to impart a variable "elasticity" to the hydraulic connection of chambers 10 and 11. The variation in the pressure in the gas cushion can be obtained by intake means 22 and output means 23 of a pressurized gas. For example, the intake means 22 can be a conduit connected to a pressurized gas source via a valve and the output means 23 can be a conduit connected to the atmosphere via a valve.

The suspension thus defined makes it possible to respond to all the movements that the driver's cab can undergo.

For example, in the case where the cab is subjected to an elevation movement in relation to the chassis while remaining parallel to it—a movement known as "bounce"—all of the pistons 9 and rods 12, 13 travel in phase, i.e. the pistons are displaced simultaneously toward the upper chambers while carrying rods 12 and 13 along in the same movement, together with an extension of rubber elements 15. In this case, during the displacement of pistons 9, the volumes of upper chambers 10 diminish and the fluid coming out of these chambers passes directly into lower chambers 11 of the cylinders that are connected thereto by ducts 17, said lower chambers consequently increasing in volume.

Thanks to this closed circuit circulation between the various chambers, the damping of the driver's cab is consistent on all sides while being performed by the flow of fluid between the chambers.

In the case where the driver's cab is subjected to a movement of longitudinal oscillations, known as "dipping", or to a movement of crosswise oscillations, called "roll", the suspension device as defined makes it possible to limit the angles of dipping and/or the angles of roll.

In the case of longitudinal oscillations, or dipping, driver's cab 2—and more particularly its front part—is lowered in the direction of the ground.

In this movement, pistons 9 of hydraulic cylinders 5a and 5b are pushed by rods 12 connected to the cab, in the direction of lower chambers 11, this movement being made possible by compressing the rubber elements 15 carried on supports 16.

During this movement lower chambers 11 of cylinders 5a and 5b diminish in volume while upper chambers 10 increase in volume.

During the reduction in the volume of chambers 11, the incompressible fluid contained in them is expelled, in the case of cylinder 5a, in the direction of upper chamber 10 of cylinder 5d through duct 17d while filling this chamber and, in the case of cylinder 5b, in the direction of upper chamber 10 of cylinder 5c through duct 17c also while filling it with the same volume that is expelled out of lower chamber 11 of cylinder 5b.

Because of this, pistons 9 of cylinders 5c and 5d, by the filling of upper chambers 10, are also subjected to a movement in a direction and of a displacement equal to that of pistons 9 of cylinders 5a and 5b, which is also made possible by compressing the rubber elements 15 on supports 16. As a result, the driver's cab, connected at its rear part to rods 12, is subjected to a movement such that said rear part remains at the same level as its front part. This is made possible by the fact that lower chambers 11 of cylinders 5c and 5d can expel the fluid contained therein respectively through duct 17b to upper chamber 10 of cylinder 5b and through duct 17a to upper chamber 10 of cylinder 5a.

Because of this, the pistons 9 are all displaced simultaneously, in the same direction and along the same path, and all of the rubber elements 15 are compressed by the same value.

Upon termination of the cause of the dipping movement, such as a braking for example, the rubber elements resume their original shapes while pushing pistons 9 via rods 13, and the suspension device returns to its original condition, such as that shown in the figure.

In the case where the cab is subjected to a roll movement, the operation of the suspension device will be similar to the one described below with the only difference being that the fluid circulation will take place either from cylinders 5b and 5d to cylinders 5c and 5a, or vice versa.

As has also been described above, the pressure of the fluid circulating between upper chambers 10 and lower chambers 11 of a cylinder to the respective lower chambers 11 and upper chambers 10 of the cylinder which is connected to it can be easily regulated by pressure variation devices 19 and more particularly by causing the pressures of gas cushions 21 to vary. This causes the pressure of the virtually incompressible fluid circulating in the ducts and hydraulic cylinders to vary, such variation making it possible to regulate the overall stiffness of the suspension device.

Of course, for movements of very slight amplitudes, the suspension of the cab in relation to the chassis is provided by rubber elements 15 alone.

Of course, the embodiment described is only an example and it could be modified, particularly by substitution of technical equivalents without thereby going outside the scope of the invention. It will also be possible to use a manual or automatic device to modify the overall stiffness of the suspension device and the damping of the movements of the cab, e.g., the valves of the intake and output means can be controlled by a computer.

What is claimed as new and desired to be secured by Letters Patent of the United States is:

1. A suspension device in a motor vehicle having a driver's cab and a chassis, for suspending the driver's cab on the chassis, comprising:

four substantially vertically extending hydraulic cylinders, each of said hydraulic cylinders having a piston including lower and upper rods respectively connecting the piston to the chassis and to the driver's cab, first and third ones of said hydraulic cylinders being on an opposite lateral side of the chassis from second and fourth ones of the hydraulic cylinders, the first and second ones of said hydraulic cylinders being positioned at a forward portion of the chassis and the third and fourth hydraulic cylinders being positioned at a rear portion of the chassis, whereby said first and fourth cylinders are mutually diagonal and said second and third cylinders are mutually diagonal, and wherein the piston of each of said hydraulic cylinders divides that cylinder into an upper chamber and a lower chamber; and a plurality of hydraulic fluid ducts, each of said ducts connecting the upper chamber of one of said hydraulic cylinders with the lower chamber of the respective hydraulic cylinder diagonal thereto.

2. The suspension device of claim including an elastically deformable element connecting said lower rod of each of said cylinders to the chassis.

3. The suspension device of claim 1 including means for regulating the fluid pressure in each of said ducts.

4. The suspension device of claim 3 wherein said pressure regulating means comprise a variable pressure gas cushion means connected to each of said ducts.

* * * * *